United States Patent Office 3,336,150
Patented Aug. 15, 1967

3,336,150
PRESSURE-SENSITIVE COPYING SHEET AND
METHOD OF MAKING
Ichiro Takahashi and Akio Watanabe, Kanagawa-ken, and Natsuki Wada, Numazu-shi, Japan, assignors to Pairotto Man-Nen-Hitsu Kabushiki Kaisha, Tokyo-to, Japan, a joint-stock company of Japan
Filed Sept. 5, 1963, Ser. No. 306,892
Claims priority, application Japan, Dec. 20, 1960, 35/49,281
4 Claims. (Cl. 117—36.1)

This application is a continuation-in-part of application Ser. No. 160,350, filed Dec. 18, 1961, and now abandoned.

The present invention relates to synthetic resin-type copying materials which consist of a pressure-sensitive transfer composition or a pressure-sensitive, transfer-copying, coated membrane layer formed on the surface of an appropriate flexible, soft base sheet. This invention concerns copying materials that are prepared by dissolving the synthetic resin in a solvent and admixing coloring matter and a non-volatile liquid color carrier with the resin solution, to form, upon evaporation of the solvent, an ink-releasing component of spongy structure on the surface of a base sheet.

Copying materials prepared from synthetic resins such as cellulose acetate, polyvinyl acetate, polyvinyl butyrate and soft vinyl chloride copolymer resin, coloring agents, and non-volatile liquid animal, vegetable, and mineral oil are well known. The coated membrane transfer layer of this kind of copying material is composed of a polymer having a fine spongy, porous structure which contains uniformly, a coloring composition consisting of a pigment or dyestuff and the non-volatile, oily color carrier. A copy inscription is obtained by the exudation of the coloring component contained in the spongy interior by pressure of a pencil or by impact of the type of a typewriter.

Resin-type copying materials have outstanding advantages over the conventional wax base copying materials. However, resin-type copying materials have several defects. They are subject to a phenomenon known as sweating. When the non-volatile, liquid color carrier of the copying composition consists of the usual mineral, vegetable, or animal oil, there is a tendency for the liquid color carrier to appear on the surface of the coated membrane layer causing the copying materials to stick to each other and causing copying papers to be stained. Sweating can be somewhat reduced by the use of semi-solid or paste like materials such as lanoline or Vaseline instead of the liquid oils as the color carrier. However, with this type of copying composition, as a result of the low fluidity and high viscosity of the color carrier, there is a tendency for the copying composition to peel or tear when copying is done repeatedly at the same section, and in addition, the depleted coloring component is not readily supplemented from another part of the copying material so that the fine spongy structure of the resin is not well utilized. In addition to these defects, stained copy and soiled hands often result from the handling and the use of resin-type copying materials of these known compositions. Furthermore, in order to get the desired copying ability and durability, it has been necessary for the coated membrane layer to be very thick.

It is an object of the present invention to make a copying material wherein no sweating, peeling or tearing occurs to the coated membrane layer, even with repeated use, and soiling due to handling and rubbing of copied inscription is minimized.

It is also an object of this invention to make a copying material which produces copied inscription of superior distinctness, and wherein the coated membrane layer show sufficient copying ability and longevity even when thin.

These and other objects are accomplished by the use of novel substances for the color carrier component.

The copying material with which this invention is concerned are composed essentially of three components; a vinyl resin which is present as a solid spongy structure, coloring matter such as pigments and dyestuffs which are contained uniformly in the spongy resin structure and a liquid color carrier which must be non-volatile, non-drying and mutually insoluble with the resin. Much research has gone into the development of suitable resins for copying materials, but until now there has been no information concerning the most suitable compositions for the non-volatile and non-drying color carrier.

The invention will be more fully understood from the following description and claims in conjunction with the accompanying drawings in which:

Figure 1:
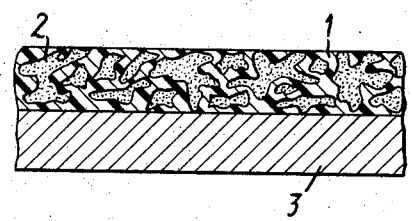
FIGURE 1 is a diagrammatic cross-section in an enlarged scale of the constitution of the copying material of this invention.

In the copying material illustrated in FIGURE 1, the element 1 is a vinyl resin having a spongy, porous structure. Element 2 is a uniform dispersion of coloring matter in a liquid, non-volatile color carrier which is immiscible with the resin and has surface active properties. Element 3 is a flexible base sheet. Copying is accomplished by expression of the dispersion element 2 from the resin 1 by impact or pressure of a writing instrument as a pencil or a typewriter.

Figure 2:
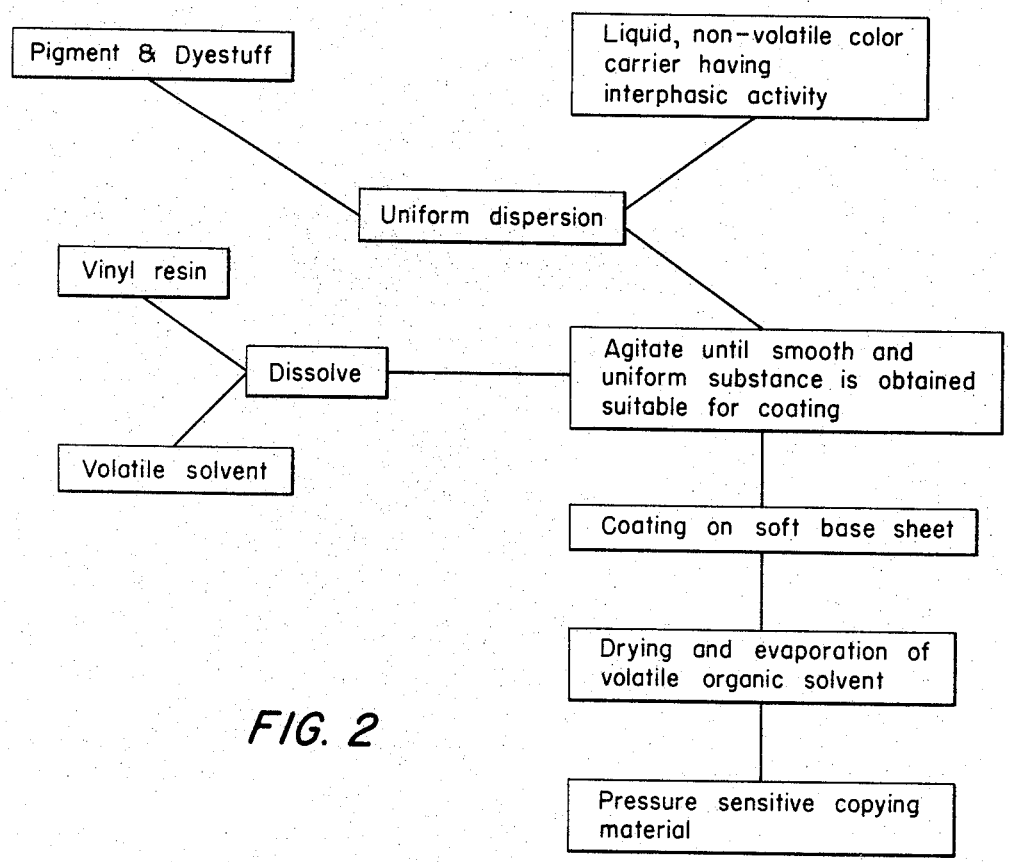
FIGURE 2 is a flow sheet illustrating the process for preparing the copying material of FIGURE 1.

A method of preparing the copying material in accordance with the invention is illustrated by the flow diagram of FIGURE 2. The vinyl resin is dissolved in a suitable, volatile solvent. The coloring matter and the liquid, non-volatile color carrier are kneaded together, for example of a three roll mill. The resin solution and mixture of coloring matter and color carrier are then kneaded together until smooth and of uniform concentration in a ball mill of other appropriate mixing device. The copy component thus obtained is applied by means of an appropriate coating machine on the base sheet or base paper 3. The volatile solvent is then evaporated to obtain the copying material of FIGURE 1.

According to the present invention, it has been found that the color carrier as the intermediate medium between the resin and the pigment is especially important and that the defects described for resin-type copying materials are primarily the result of heretofore improper choice of color carrier. It has been found now, that by the use of a color carrier which has interphase activity, that is, a color carrier which is a surface active agent, the defects inherent in conventional resin-type copying material are cured. In particular, the sweating problem is eliminated. These improvements result from the affinity of the improved color carrier for both resin and pigment, inasmuch as the resin and pigment differ widely in polarity.

By using a substance for the color carrier which has within itself both hydrophobic properties and hydrophilic properties, adequate binding among pigment, resin and color carrier occurs, and the sweating and the staining of ordinary resin-type copying materials are avoided.

In addition to being a surface active agent, possessing both hydrophobic and hydrophilic properties, the color carrier must also be liquid at room temperature, non-volatile, immiscible with the resin and soluble in the volatile solvent used in the preparation of the copying composition. Substances which have been found to possess all of these qualities are polyhydric alcohols which have been partially esterified with long chain aliphatic acids. The long chain aliphatic group provides the needed hydrophobic property and the remaining free hydroxyl group or groups provide the hydrophilic property. By varying the length and the number of ester chains and the number of free hydroxyl groups, substances having different polarities are produced. By proper adjustment of the affinity and polarity among the resin, pigment, and liquid color carrier, it is possible to produce ideal, resin-type copying materials free from sweating and staining at low pressure so that clear copy is produced at the desired pressure, at which time the color carrier and the coloring matter are expressed from the resin.

Polyhydric alcohols that have been found to be particularly useful in this invention when partially esterified are glycerine, erythritol, pentaerythritol, sorbitol and sorbitan. The partially esterified polyhydric alcohols may be in the form of mono-, di-, or tri-esters, so long as at least one free hydroxyl group remains to provide the necessary hydrophilic property. Long chain aliphatic acids having at least ten carbon atoms provide satisfactory ester groups. An example of a representative substance which has the desired properties is sorbitan trioleate which has the following structural formula:

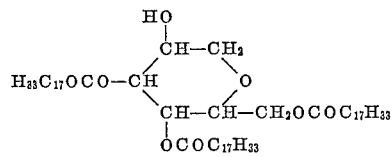

Mineral, vegetable and animal oils of the conventional type can be used together with the partially esterified polyhydric alcohols to form the color carrier, and the proportion of each used for the best result will vary depending on the kind of vinyl resin selected, the coloring matter to be used, and the particular partially esterified polyhydric alcohol involved.

Suitable vinyl resins for practicing this invention include polymethacrylate ester resin, polyacrylate ester resin, vinyl chloride resin, and soft copolymer of vinyl chloride and vinyl acetate, and polyvinyl butylate resin.

The following examples of the composition of the pressure-sensitive copying material are set forth as exemplary and should not be construed as limiting.

*Example 1*

| | Parts |
|---|---|
| Soft copolymers of vinyl chloride and vinyl acetate | 10 |
| Mineral oil | 10 |
| Pentaerythritol monooleate | 8 |
| Prussian blue | 8 |
| Ethyl acetate | 52 |
| Toluene | 15 |

*Example 2*

| | |
|---|---|
| Soft copolymer of vinyl chloride and vinyl acetate | 10 |
| Castor oil | 13 |
| Sorbitan trioleate | 9 |
| Carbon black | 5 |
| Alkali blue | 2.1 |
| Ethyl acetate | 54.4 |
| Toluene | 13.8 |

*Example 3*

| | |
|---|---|
| Polyvinyl butylate | 10 |
| Sorbitan monolaurate | 15 |
| Prussian blue | 8 |
| Ethyl acetate | 50 |
| Toluene | 13 |

*Example 4*

| | Parts |
|---|---|
| Soft copolymer of vinyl chloride and vinyl acetate | 10 |
| Camellia oil | 6 |
| Glycerine monooleate | 12 |
| Lake red | 10 |
| Ethyl acetate | 55 |
| Toluene | 18 |

*Example 5*

| | |
|---|---|
| Soft copolymer of vinyl chloride and vinyl acetate | 6 |
| Polymethyl methacrylate | 4 |
| Sorbitan monooleate | 13 |
| Castor oil | 9 |
| Prussian blue | 8 |
| Alkali blue | 3 |
| Toluene | 15 |

*Example 6*

| | |
|---|---|
| Soft copolymer of vinyl chloride and vinyl acetate | 3 |
| Polymethyl methacrylate | 7 |
| Glycerine monooleate | 10 |
| Carbon black | 5 |
| Alkali blue | 2.1 |
| Ethyl acetate | 54.4 |
| Toluene | 13.8 |

*Example 7*

| | |
|---|---|
| Polymethyl methacrylate | 10 |
| Pentaerythritol monooleate | 8 |
| Mineral oil | 5 |
| Prussian blue | 8 |
| Ethyl acetate | 50 |
| Toluene | 13 |

*Example 8*

| | |
|---|---|
| Polymethyl methacrylate | 10 |
| Sorbitan trioleate | 10 |
| Carbon black | 5 |
| Alkali blue | 2.1 |
| Toluene | 50 |

The vinyl resin as shown in the foregoing compositions is dissolved in ethyl acetate which is volatile component in order to adjust the resin solvent. On the other hand, colouring matter such as pigment and dyestuff and the liquid components of fatty acid hydroxy ester which is non-volatile and non-drying having one or more than one of hydroxyl group are kneaded, for example, in a three roll mill and then a resin solvent which had been prepared previously is added thereto, which are then kneaded together uniformly until the mixture becomes a substance of smooth, uniform concentration, for example, in a ball mill or appropriate mixing device.

The copying component obtained by means of the aforesaid process is applied by means of an appropriate coating machine on the base sheet or paper for carbon paper, and thereafter, the volatile matter is evaporated off to obtain copying material.

While preferred examples of the invention have been particularly described, it will be understood that the invention is in no way limited to these examples.

What we claim is:

1. A pressure-sensitive copying material which comprises a flexible base sheet, resin layer having a spongy, porous structure bound to said base sheet, and a mixture of coloring matter in a liquid, non-volatile partial ester of a polyhydric alcohol selected from the group consisting of glycerine, erythritol, pentaerythritol, sorbitol and sorbitan, said partial ester being immiscible with said resin, having at least one long chain, aliphatic acid ester group of at least 10 carbon atoms and having at least one free hydroxyl group, said mixture being uniformly dispersed in said resin layer.

2. A pressure-sensitive copying material which comprises a flexible base sheet, a resin layer having a spongy, porous structure bound to said base sheet and a mixture of coloring matter in a color carrier uniformly dispersed in said resin layer, said color carrier consisting of an oily non-volatile, organic material immiscible with said resin and a liquid partial ester of a polyhydric alcohol selected from the group consisting of glycerine, erythritol, pentaerythritol, sorbitol and sorbitan, said partial ester being immiscible with said resin, having at least one long chain aliphatic acid ester group of at least 10 carbon atoms and having at least one free hydroxyl group.

3. A process of preparing pressure-sensitive, resin-type copying material which comprises dissolving a vinyl resin in an inert, volatile organic solvent, admixing with the resin solution until of uniform consistency coloring matter and a liquid non-volatile color carrier consisting of a partial ester of a polyhydric alcohol selected from the group consisting of glycerine, erythritol, pentaerythritol, sorbitol and sorbitan, said partial ester being immiscible with said resin and having at least one long chain aliphatic acid ester group of at least 10 carbon atoms and having at least one free hydroxyl group, coating a flexible base sheet with the mixture of resin, volatile solvent, coloring matter and color carrier, and evaporating said volatile solvent.

4. A process of preparing pressure-sensitive resin-type copying material according to claim 3 wherein in addition to said polyhydric alcohol, said color carrier consists of an oily, non-volatile organic material immiscible with said resin and selected from the group consisting of animal oil, vegetable oil and mineral oil.

References Cited
UNITED STATES PATENTS

| | | | |
|---|---|---|---|
| 2,893,890 | 7/1959 | Harvey | 117—36.1 |
| 2,984,582 | 5/1961 | Newman et al. | 117—36.4 |
| 2,989,493 | 6/1961 | Clark et al. | 117—36.1 |
| 3,037,879 | 6/1962 | Newman et al. | 117—36.1 |

MURRAY KATZ, *Primary Examiner.*